United States Patent
Aljundi

(10) Patent No.: US 11,325,077 B2
(45) Date of Patent: May 10, 2022

(54) COMPOSITE MEMBRANE CONTAINING A POLYDOPAMINE-POLY ACYL HALIDE MATRIX INCORPORATING CARBIDE-DERIVED CARBON AND METHODS THEREOF

(71) Applicant: KING FAHD UNIVERSITY OF PETROLEUM AND MINERALS, Dhahran (SA)

(72) Inventor: Isam Hassan Aljundi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 186 days.

(21) Appl. No.: 16/662,419

(22) Filed: Oct. 24, 2019

(65) Prior Publication Data

US 2021/0121831 A1 Apr. 29, 2021

(51) Int. Cl.
*B01D 71/68* (2006.01)
*B01D 69/10* (2006.01)
(Continued)

(52) U.S. Cl.
CPC ......... *B01D 71/68* (2013.01); *B01D 67/0013* (2013.01); *B01D 69/10* (2013.01);
(Continued)

(58) Field of Classification Search
CPC .... B01D 2323/30; B01D 69/10; B01D 69/12; B01D 69/125; B01D 69/147; B01D 69/148; B01D 71/021; B01D 71/56; B01D 71/60
See application file for complete search history.

(56) References Cited

U.S. PATENT DOCUMENTS

| 4,743,629 A | 5/1988 | Karakelle et al. |
| 7,674,560 B2 | 3/2010 | Michot et al. |

(Continued)

FOREIGN PATENT DOCUMENTS

| CN | 105013340 A | 11/2015 |
| CN | 108854603 A | 11/2018 |

OTHER PUBLICATIONS

Abdelrahman Mohammedelfatih Awad Babiker, Mixed Matrix Membrane for $CO_2$ Separation From Natural Gas, Thesis, Master of Science in Chemical Engineering, http://eprints.kfupm.edu.sa/140366/1/Thesis_2-_Copy.pdf, May 2017, 110 pages.

(Continued)

*Primary Examiner* — Ana M Fortuna
(74) *Attorney, Agent, or Firm* — Oblon, McClelland, Maier & Neustadt, L.L.P.

(57) ABSTRACT

A composite membrane including carbide-derived carbon (CDC) particles deposited onto a surface of an intermediate layer which is supported on a porous polysulfone substrate. The intermediate layer contains reacted units of a polyfunctional acyl halide (e.g. trimesoyl chloride) and polydopamine. Methods of making the composite membrane via techniques such as filtration-assisted deposition of CDC particles and interfacial polymerization are specified. Water flux and oil rejection (e.g. diesel) performances of the composite membrane are evaluated. A method of separating an organic compound, such as hydrocarbons, from an aqueous sample utilizing the membrane is also provided.

17 Claims, 4 Drawing Sheets

(51) Int. Cl.
*B01D 71/60* (2006.01)
*B01D 69/12* (2006.01)
*B01D 67/00* (2006.01)
*C02F 1/44* (2006.01)
*B01D 71/02* (2006.01)
*C02F 101/32* (2006.01)

(52) U.S. Cl.
CPC ......... *B01D 69/125* (2013.01); *B01D 71/021* (2013.01); *B01D 71/60* (2013.01); *C02F 1/44* (2013.01); *B01D 2257/702* (2013.01); *B01D 2323/26* (2013.01); *B01D 2323/30* (2013.01); *B01D 2325/02* (2013.01); *C02F 2101/32* (2013.01)

(56) References Cited

U.S. PATENT DOCUMENTS

| | | | | |
|---|---|---|---|---|
| 8,017,050 | B2* | 9/2011 | Freeman | B01D 71/60 |
| | | | | 264/48 |
| 8,567,612 | B2* | 10/2013 | Kurth | B01D 67/0093 |
| | | | | 210/500.38 |
| 2006/0275637 | A1* | 12/2006 | Nakazawa | H01M 8/0289 |
| | | | | 429/483 |
| 2010/0051538 | A1* | 3/2010 | Freeman | B01D 71/60 |
| | | | | 210/500.33 |
| 2012/0080378 | A1* | 4/2012 | Revanur | B01D 67/0093 |
| | | | | 210/644 |
| 2012/0093709 | A1* | 4/2012 | Gogotsi | C01B 32/00 |
| | | | | 423/445 R |
| 2012/0148473 | A1 | 6/2012 | Kramarenko | |
| 2012/0241371 | A1* | 9/2012 | Revanur | B82Y 40/00 |
| | | | | 210/488 |
| 2013/0081991 | A1* | 4/2013 | Ito | B01D 53/22 |
| | | | | 210/321.72 |
| 2013/0146530 | A1* | 6/2013 | Wang | B01D 67/0079 |
| | | | | 210/500.38 |
| 2013/0284667 | A1* | 10/2013 | Pinnavaia | G06F 1/203 |
| | | | | 210/500.25 |
| 2015/0328598 | A1* | 11/2015 | Ferguson | B01F 1/0038 |
| | | | | 422/278 |
| 2016/0158707 | A1* | 6/2016 | Heijnen | B01D 61/02 |
| | | | | 210/490 |
| 2016/0325239 | A1* | 11/2016 | Adden | B01D 71/10 |
| 2017/0331146 | A1* | 11/2017 | Haba | H01M 10/0525 |
| 2021/0238032 | A1* | 8/2021 | Stoughton | C12Q 1/6869 |

OTHER PUBLICATIONS

Abdelrahman Awad, et al., "Layer-by-layer assembly of carbide derived carbon-polyamide membrane for $CO_2$ separation from natural gas", Energy, vol. 157, Aug. 15, 2018, pp. 188-199.

Stephen Brunauer, et al., "Adsorption of Gases in Multimolecular Layers", The Bureau of Chemistry and Soils and George Washington University, vol. 60, Feb. 1938, pp. 309-319.

Anwar Ui Haq Khan, et al., "Improved hydrophilicity and antifouling properties of polyamide TFN membrane comprising carbide derived carbon", Desalination, vol. 420, 2017, pp. 125-135.

Anwur Ui Haq Khan, "Water Desalination Using Carbide Derived Carbon (CDC)/Mixed Matrix Membrane", Thesis, Master of Science in Chemical Engineering, http://eprints.kfupm.edu.sa/140105/1/WATER- DESALINATION-USING-CARBIDE-DERIVED-CARBON3rd-may-2016_(online).pdf, May 2016, 115 pages.

* cited by examiner

(12) United States Patent
US 11,325,077 B2

COMPOSITE MEMBRANE CONTAINING A POLYDOPAMINE-POLY ACYL HALIDE MATRIX INCORPORATING CARBIDE-DERIVED CARBON AND METHODS THEREOF

BACKGROUND OF THE INVENTION

Technical Field

The present disclosure relates to a membrane that has a carbide-derived carbon deposited intermediate layer disposed on a porous polysulfone support. The present disclosure also relates to a method of fabricating the membrane, and a method of using the membrane to separate hydrocarbons from contaminated water.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Oil/water separation using membrane technologies is of great research interest to many industries including petroleum production, chemical manufacture, and wastewater treatment. Membrane filtration, particularly polymer membrane filtration, has been used for separating relatively clean water from oil/water emulsions and treating oily wastewater to generate clean enough water for discharge.

Carbide-derived carbon (CDC) is a tunable nanostructured carbonaceous material derived from carbide precursors. US 2012/0093709 A1 by Gogotsi et al. (Gogotsi) discloses a method for producing a nanoporous CDC material with a tunable pore structure and a narrow pore size, as well as CDC materials prepared by the method. Gogotsi describes exposing a metal carbide precursor to a halogen, e.g., fluorine, chlorine, bromine, and/or iodine, so that the metal is extracted from the carbide precursor. Gogotsi describes relevant metal carbides to include SiC, TiC, ZrC, $B_4C$, TaC, $Mo_2C$, and $Ti_3SiC_2$. Gogotsi describes using the CDC materials in, e.g., adsorbents (e.g. molecular sieves), gas storage, catalysts, battery electrodes, supercapacitors, water or air filters, and medical devices. However, Gogotsi fails to disclose a crosslinked polydopamine-based membrane supported on a polyethersulfone substrate. Moreover, Gogotsi provides no information on using CDC as fillers to prepare a composite membrane. Gogotsi does not disclose treatment of oily water.

Khan et al. (Khan) (*Desalination* 2017, 420, 125-135) disclose improving the fouling resistance of reverse osmosis (RO) membranes, a characteristic that is a valuable property in the desalination industry. Khan reports the preparation of CDC/polyamide hybrid membrane, aiming to improve the fouling-resistance of RO membranes. The polyamide network is built on m-phenylenediamine and trimesoyl chloride. TEM images of Khan's CDC particles show a mixture of amorphous and ordered graphitized carbon and a degree of ordering that is directly proportional to the chlorination temperature. SEM images of Khan's membranes show a ridge-valley structure of aromatic polyamide. Khan reports improved surface hydrophilicity of its membrane compared a control polyamide membrane. Desalination experiments showed that the permeate flux increased 51%, 45%, and 38% under pure water, brackish water, and fouling conditions; respectively. Khan's control membrane lost 26% of its initial flux while a CDC-doped membrane lost only 11.5% after 2 hours of continuous operation. Khan reports that CDC can significantly enhance the fouling resistance and permeability of its polyamide RO-membranes. However, Khan discloses neither a crosslinked polydopamine-based CDC composite top layer nor a polyethersulfone support layer. Khan does not disclose separating oil from oily water with the RO membrane. In addition, Khan does not describe fabricating a composite membrane via a pressure-assisted filtration method.

U.S. Pat. No. 4,743,629 A by Karakelle et al. (Karakelle) relates to a semipermeable membrane containing a crosslinked polyetherurethane composition having 20-50% of hard segments. The polyetherurethane composition involves a reaction product of a diisocyanate, polyethylene oxide, a chain extending diol and a trihydroxy crosslinking agent. However, Karakelle fails to disclose the inclusion of any CDC materials to the polyetherurethane composition and a composite membrane. Karakelle does not describe a method of preparing a CDC-polymer composite membrane.

U.S. Pat. No. 7,674,560 B2 by Michot et al. (Michot) relates to crosslinked sulfonated ionic resins that are partially or completely fluorinated, as well as a method of preparing the ionic resins. The ionic resins may be useful in electrochemical cells as well as electrochemical synthesis of organic and inorganic compounds. However, Michot discloses neither CDC materials nor a polydopamine based polyamide network. Michot does not describe a method of preparing a CDC-polymer composite membrane.

Despite these recent advances, there is still a need to develop more effective membranes and methods for oil/water separation. In view of the forgoing, one objective of the present disclosure is to provide a composite membrane containing a carbide-derived carbon particles deposited intermediate layer disposed on a porous polysulfone support. The intermediate layer contains a polycondensation reaction product of polydopamine and a polyfunctional acyl halide. A further objective of the present disclosure is to provide a method of fabricating the composite membrane and a water purification method that involves removing hydrocarbons from aqueous samples with the membrane.

BRIEF SUMMARY OF THE INVENTION

According to a first aspect, the present disclosure relates to a composite membrane, comprising, consisting essentially of, or consisting of (i) a porous support layer containing a polysulfone, (ii) an intermediate layer containing reacted units of a polyfunctional acyl halide having at least two acyl halide groups and polydopamine, and (iii) carbide-derived carbon particles deposited onto a surface of the intermediate layer, wherein the carbide-derived carbon particles are at least one selected from the group consisting of SiC—, $Fe_3C$—, WC—, $Ti_3SiC_2$—, ZrC—, $B_4C$—, TaC—, $Mo_2C$—, and TiC-derived carbon particles, and the intermediate layer is disposed on at least a portion of a surface of the porous support layer.

In one embodiment, the polysulfone is a polyethersulfone.

In one embodiment, the carbide-derived carbon particles are TiC-derived carbon particles.

In a further embodiment, the TiC-derived carbon particles have a BET surface area of 2,200-3,000 $cm^2/g$.

In a further embodiment, the TiC-derived carbon particles have a pore volume of 0.9-1.8 $cm^3/g$.

In one embodiment, the polyfunctional acyl halide is a polyfunctional acyl chloride.

In one embodiment, the polyfunctional acyl halide is at least one selected from the group consisting of trimesoyl chloride, 1,2,4-benzenetricarbonyl trichloride, 1,2,4,5-benzenetetracarbonyl tetrachloride, isophthaloyl chloride, terephthaloyl chloride, and [1,1'-biphenyl]-4,4'-dicarbonyl dichloride.

In one embodiment, the polyfunctional acyl halide is trimesoyl chloride.

In one embodiment, the carbide-derived carbon particles are present in an amount ranging from 0.01 wt % to 4 wt % relative to a total weight of the intermediate layer.

In one embodiment, the composite membrane has a water flow of 0.2-0.5 mL/s, determined by exposing the composite membrane to water at a transmembrane pressure of 150-450 kPa.

According to a second aspect, the present disclosure relates to a method of making the composite membrane of the first aspect. The method involves the steps of (i) casting a first solution comprising dopamine onto at least a portion of a surface of the porous support layer to form a polydopamine layer disposed on the porous support layer, (ii) depositing the carbide-derived carbon particles onto a surface of the polydopamine layer to form a deposited polydopamine layer disposed on the porous support layer, and (iii) reacting the deposited polydopamine layer and a second solution comprising the polyfunctional acyl halide, thereby forming the composite membrane.

In one embodiment, the first solution further comprises a polar solvent.

In one embodiment, dopamine is present in an amount of 0.1-10 g/L relative to a total volume of the first solution.

In one embodiment, the first solution has a pH of 7-10.

In one embodiment, the method further involves drying the polydopamine layer disposed on the porous support layer at a temperature of 25-125° C. for 0.1-24 hours prior to the depositing.

In one embodiment, the second solution further comprises a non-polar solvent.

In one embodiment, the polyfunctional acyl halide is present in an amount of 0.01-1 wt % relative to a total weight of the second solution.

According to a third aspect, the present disclosure relates to a method for removing a hydrocarbon from an aqueous sample. The method involves delivering the aqueous sample having an initial concentration of the hydrocarbon into a feed side of a chamber containing the composite membrane of the first aspect that divides the chamber into the feed side and a permeate side, and collecting from the permeate side an aqueous sample having a reduced concentration of the hydrocarbon compared to the initial concentration.

In one embodiment, the hydrocarbon is diesel.

In one embodiment, the aqueous sample has an initial concentration of the hydrocarbon in a range of 100-2,000 ppm, and greater than 80% of a total amount of the hydrocarbon is removed from the aqueous sample.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
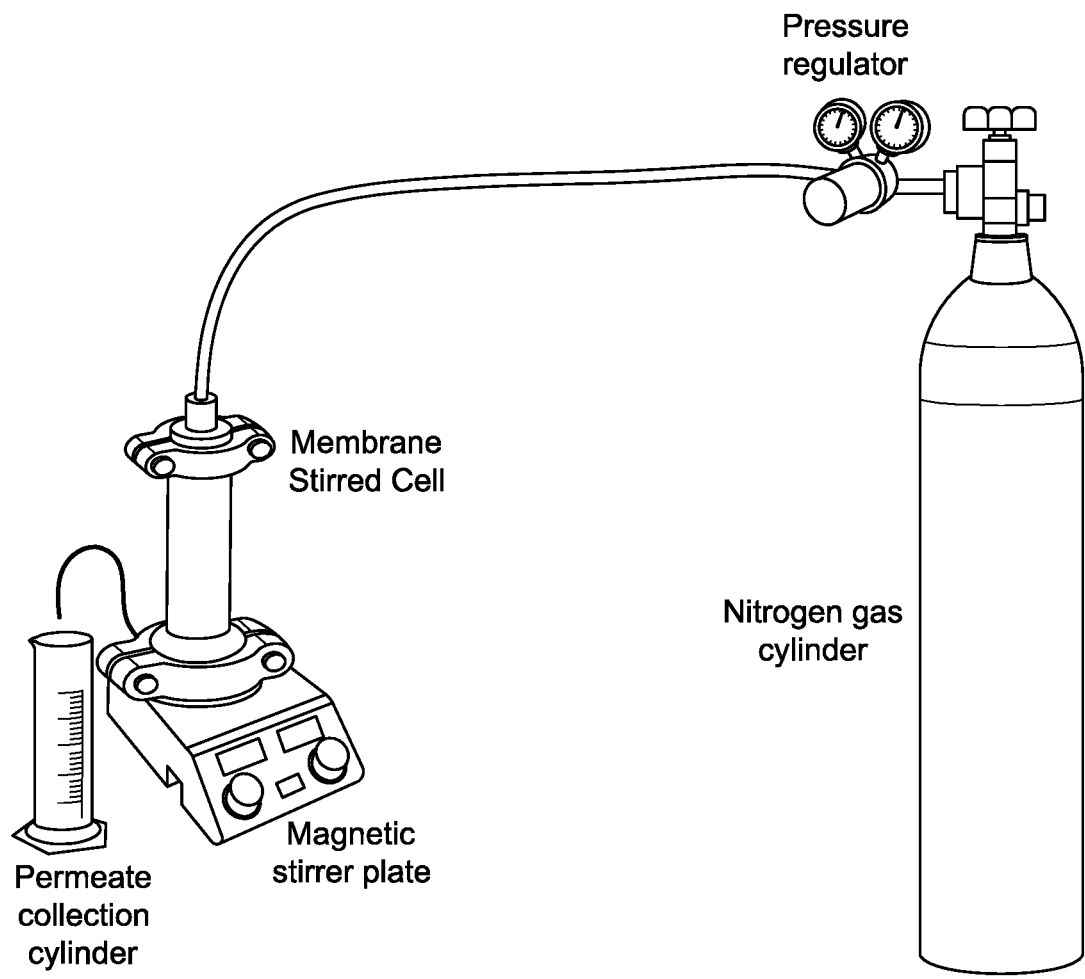
FIG. 1 illustrates an experimental setup for membrane testing.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values).

The membrane or methods disclosed herein can "comprise", "consist essentially of", or "consist of" particular components, compositions, method steps disclosed throughout the specification. A membrane consisting essentially of the components as defined herein would not exclude other materials that do not materially affect the basic and novel characteristic(s) of the membrane. For example, other components may be included in the membrane so long as the other components do not substantially change the surface morphology, water flow, and/or oil rejection of the membrane.

The term "halide", as used herein, means fluoride, chloride, bromide, and iodide.

The term "halogen", as used herein, means fluoro, chloro, bromo, and iodo.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{14}N$ and $^{15}N$, isotopes of oxygen include $^{16}O$, $^{17}O$ and $^{18}O$, and isotopes of sulfur include $^{32}S$, $^{33}S$, $^{34}S$, and $^{36}S$. Isotopically labeled compounds of the disclosure can generally be prepared by conventional techniques known to those of ordinary skill in the art or by processes and methods analogous to those described herein, using an appropriate isotopically labeled reagent in place of the non-labeled reagent otherwise employed.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components.

The present disclosure relates to a composite membrane, comprising, consisting essentially of, or consisting of (i) a porous support layer containing a polysulfone, (ii) an intermediate layer containing reacted units of a polyfunctional acyl halide having at least two acyl halide groups and polydopamine, and (iii) carbide-derived carbon particles deposited onto a surface of the intermediate layer.

The composite membrane disclosed herein may be a thin film membrane, a flat sheet membrane, a tubular membrane, or a spiral membrane. The composite membrane may be in the form of various shapes, for example, flat (e.g., for a disc-shaped membrane), bent, curved (e.g., a cylinder shaped membrane), and rippled. In one embodiment, a surface of the composite membrane is curved. In a preferred embodiment, the surface of the composite membrane is flat. As used herein, the term "flat" refers to the general shape of the macrostructure of the composite membrane (i.e. a level surface) and does not refer to a microscopically smooth surface. For example, the composite membrane may have microscopic wrinkles, pores, bumps, ridges, etc. and still have a substantially "flat" macrostructure.

In one embodiment, the composite membrane is a thin film membrane and has a thickness of 20-2,000 µm, 25-1,500 µm, 50-1,000 µm, 100-800 µm, 200-600 µm, 250-500 µm, or 300-400 µm. In a preferred embodiment, the composite membrane is disc-shaped, and a diameter of the membrane may be 10-100 mm, 20-80 mm, 30-60 mm, 40-50 mm, or about 47 mm. In some embodiments, the composite membrane is in a form of a rectangular sheet having a width of 2-110 cm, 10-70 cm, or 20-60 cm. A length of the rectangular sheet may range from 10 cm to 122 m, 100 cm to 50 m, 1 m to 20 m, or 5 m to 10 m.

Unlike a spongy membrane, a dense membrane may be essentially free of macrovoids including pores. When compared to dense membranes, a porous, multi-layered membrane may be advantageous as it allows for high flux permeation and is capable of performing multi-stage separation processes across a single membrane. In one embodiment, the composite membrane disclosed herein is a multi-layered porous membrane. The composite membrane disclosed herein in any of its embodiments may be a reverse osmosis membrane, a microfiltration membrane, an ultrafiltration membrane, or a nanofiltration membrane.

The polyfunctional acyl halide of the present disclosure contains at least 2, preferably at least 3, preferably at least 4 acyl halide groups. In one embodiment, the polyfunctional acyl halide is a polyfunctional acyl chloride, a polyfunctional acyl bromide, or both. Preferably, the polyfunctional acyl halide is a polyfunctional acyl chloride. In one or more embodiments, the polyfunctional acyl halide is at least one selected from the group consisting of trimesoyl chloride (1,3,5-benzenetricarbonyl trichloride), 1,2,4-benzenetricarbonyl trichloride, 1,2,4,5-benzenetetracarbonyl tetrachloride, isophthaloyl chloride, terephthaloyl chloride, and [1,1'-biphenyl]-4,4'-dicarbonyl dichloride. In a most preferred embodiment, the polyfunctional acyl halide is trimesoyl chloride.

As used herein, monomers are molecules which can undergo polymerization, thereby contributing constitutional repeating units to the structures of a macromolecule or polymer. The process by which monomers combine end to end to form a polymer is referred to herein as "polymerization".

As used herein, polydopamine (PDA) refers to a dopamine (3,4-dihydroxyphenethyl amine) derived synthetic polymer.

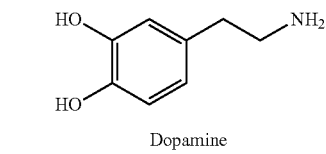 [SMILES: NCCc1ccc(O)c(O)c1]

Dopamine

Polydopamine may be prepared via an oxidative self-polymerization of dopamine under neutral or slightly basic pH condition. The adhesive properties of polydopamine have enabled its application as a surface modifying coating material. Despite decades of polydopamine research, the complete understanding of its macromolecular structure has not yet been fully established. The polymerization process of dopamine to polydopamine may initially involve oxidation of dopamine to a dopaminequinone, which is followed by a cyclization of the primary amine to form 5,6-dihydroxyindole (DHI). DHI may undergo self-condensation to form DHI dimers, trimers, tetramers, and/or oligomers via dehydrogenative C—C bond formation. Alternatively, polymerization of dopamine is proposed to proceed via direct C—C bond formation among individual dopamine molecules.

In one embodiment, the polydopamine used herein involves a composition containing a mixture of polydopamine and dopamine. When dopamine is present, a weight ratio of dopamine to polydopamine may be in a range of 1:100 to 1:1, 1:90 to 1:2, 1:80 to 1:3, 1:70 to 1:4, 1:60 to 1:5, 1:50 to 1:6, 1:40 to 1:7, 1:30 to 1:8, 1:20 to 1:9, or 1:15 to 1:10.

It is equally envisaged that other catecholamines including, but not limited to, norepinephrine, tyrosine, 3,4-dihydroxyphenylalanine (DOPA), tyramine, 3-methoxytyramine, and octopamine may be used in addition to or in lieu of the aforementioned dopamine in the preparation of the matrix, which will be discussed hereinafter. In at least one embodiment, the polydopamine used herein is devoid of alkyl amines including piperazine and triethylenetetramine. In at least one embodiment, the polydopamine used herein is devoid of m-phenylenediamine. The polyamines noted above (e.g. piperazine, triethylenetetramine, m-phenylenediamine) do not undergo spontaneous self-polymerization as dopamine and generally lack the adhesion properties of polydopamine.

As used herein, "crosslinking", "cross-linking", "crosslinked", "cross-linked", a "crosslink", or a "cross-link" refers to polymers and resins containing branches that connect polymer chains via bonds that link one polymer chain to another. The crosslink may be an atom, a group of atoms, or a number of branch points connected by bonds, groups of atoms, or polymer chains. A crosslink may be formed by chemical reactions that are initiated by heat, pressure, radiation, change in pH, etc. with the presence of at least one crosslinking monomer having more than two extension points, which is a monomer having more than two reactive sites. In certain embodiments, the polyfunctional acyl halide having at least 3 reactive sites (e.g. trimesoyl chloride) functions as a crosslinking monomer, where each reactive position can act as an extension point and form a crosslink upon reacting with the polydopamine.

A "polycondensation" refers to a form of step growth polymerization where monomers join together by losing small molecules such as hydrogen halide (e.g. hydrogen chloride), water, and methanol, as byproducts. This is in contrast to addition polymerizations which often involve reactions of unsaturated molecules. In one embodiment, the polyfunctional acyl halide is trimesoyl chloride, and the intermediate layer of the present disclosure comprises a crosslinked polyamide resulting from a polycondensation reaction of the polyfunctional acyl halide and the amine functionalities present in the polydopamine. In another embodiment, the polyfunctional acyl halide is trimesoyl chloride, and the intermediate layer comprises a crosslinked polyester resulting from a polycondensation reaction of the polyfunctional acyl halide and the hydroxy functionalities present in the polydopamine. In a related embodiment, a weight ratio of trimesoyl chloride to polydopamine is in a range of 1:5 to 5:1, 1:4 to 4:1, 1:3 to 3:1, 1:2 to 2:1, 2:3 to 3:2, or about 1:1.

In one embodiment, a thickness of the intermediate layer is up to 1 μm, preferably 0.01-0.5 μm, preferably 0.1-0.2 μm. However, in certain embodiments, the thickness of the intermediate layer may be less than 0.01 μm or greater than 1 μm.

The composite membrane of the present disclosure also includes carbide-derived carbon particles. In one or more embodiments, the carbide-derived carbon particles are present in an amount ranging from 0.01 wt % to 4 wt %, from 0.05 wt % to 3.5 wt %, from 0.1 wt % to 3 wt %, from 0.2 wt % to 2.5 wt %, from 0.25 wt % to 2 wt %, from 0.3 wt % to 1.5 wt %, from 0.35 wt % to 1.25 wt %, from 0.4 wt % to 1 wt %, from 0.45 wt % to 0.95 wt %, from 0.5 wt % to 0.9 wt %, from 0.55 wt % to 0.85 wt %, from 0.6 wt % to 0.8 wt %, from 0.65 wt % to 0.75 wt %, or about 0.7 wt % relative to a total weight of the intermediate layer.

As referred herein, carbide-derived carbon (CDC) materials are generally tunable nanoporous carbons derived from carbides. A large family of CDC materials can be prepared from any metal carbide, such as SiC, TiC, $B_4C$, $Ti_3SiC_2$, WC, $Mo_2C$, $Fe_3C$, etc., or mixtures thereof, by selective removal of the metal atom using a halogen gas at elevated temperatures (200 to 1200° C.). For example, the synthesis of CDC from TiC powder can be explained by the chemical reaction shown below in Equation 1:

$$TiC(s) + 2Cl_2(g) \rightarrow TiCl_4 + C(s) \qquad \text{Eq. 1.}$$

A particle is defined as a small object that behaves as a whole unit with respect to its transport and properties. An average diameter (e.g., average particle size) of the particle, as used herein, and unless otherwise specifically noted, refers to the average linear distance measured from one point on the particle through the center of the particle to a point directly across from it. For a circle, an oval, an ellipse, and a multilobe, the term "diameter" refers to the greatest possible distance measured from one point on the shape through the center of the shape to a point directly across from it. For polygonal shapes, the term "diameter", as used herein, and unless otherwise specified, refers to the greatest possible distance measured from a vertex of a polygon through the center of the face to the vertex on the opposite side.

The carbide-derived carbon may be present in the form of particles of the same shape or different shapes, and of the same size or different sizes. In some embodiments, the carbide-derived carbon particles are in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface). The carbide-derived carbon particles may have an average diameter in a range of 0.05-2 μm, 0.1-1 μm, 0.25-0.8 μm, or 0.4-0.6 μm. The carbide-derived carbon particles may be agglomerated or non-agglomerated (i.e., the particles are well separated from one another and do not form clusters). In one embodiment, the carbide-derived carbon particles are agglomerated and the agglomerates have an average diameter in a range of 0.5-10 μm, 1-6 μm, or 2-4 μm. The size and shape of particles may be analyzed by techniques such as dynamic light scattering (DLS), scanning electron microscopy (SEM), transmission electron microscopy (TEM), and/or atomic force microscopy (AFM).

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, pore diameter, pore volume, and BET surface area are measured by gas adsorption analysis, mercury intrusion porosimetry, preferably $N_2$ adsorption analysis (e.g. $N_2$ adsorption isotherms).

CDC particles generally have a BET surface area in a range from 1000 to 3000 $m^2/g$, and have a tunable pore size (0.5 to 3 nm), pore shape, specific surface area, and surface chemistry, e.g., by changing the synthetic conditions, composition, and structure of the carbide precursor. In one or more embodiments, the carbide-derived carbon particles used herein are at least one selected from the group consisting of SiC—, $Fe_3C$—, WC—, $Ti_3SiC_2$—, ZrC—, $B_4C$—, TaC—, $Mo_2C$—, and TiC-derived carbon particles. In a related embodiment, the carbide-derived carbon particles have a BET surface area of at least 800, 900, 1000, 1200, 1250, 1300, 1500, 1750, 2000, or 2500 $m^2/g$, and/or up to 4500, 4000, 3500, 3250, 3000, 2750, 2500, 2250, 2000, or 1800 $m^2/g$.

In a preferred embodiment, the carbide-derived carbon particles are TiC-derived carbon particles. In a related embodiment, the TiC-derived carbon particles have a BET surface area ranging from 2,000 to 3,200 $m^2/g$, preferably from 2,200 to 3,000 $m^2/g$, more preferably from 2,400 to 2,800 $m^2/g$, even more preferably from 2,500 to 2,700 $m^2/g$, or about 2590 $m^2/g$.

The surface of the carbide-derived carbon particles may be microporous or mesoporous. The term "microporous" refers to a surface having an average pore diameter of less than 2 nm, while the term "mesoporous" refers to a surface having an average pore diameter of 2-50 nm. In one embodiment, the carbide-derived carbon particles are microporous and have a pore size of 0.5-1.9 nm, 0.8-1.8 nm, 1-1.7 nm, 1.2-1.6 nm, or 1.4-1.5 nm. In an alternative embodiment, the carbide-derived carbon particles used herein are mesoporous and have a pore size of 2-50 nm, 5-40 nm, 10-30 nm, 12-25 nm, 15-20 nm, or 17-19 nm.

In a preferred embodiment, the carbide-derived carbon particles are TiC-derived carbon particles. The TiC-derived carbon particles may have a pore volume ranging from 0.8 to 2 cm³/g, preferably from 0.9 to 1.8 cm³/g, more preferably from 1 to 1.6 cm³/g, even more preferably from 1.1 to 1.4 cm³/g, or about 1.22 cm³/g. In a preferred embodiment, the TiC-derived carbon particles have a mixture of micropores and mesopores, wherein the micropore volume is in a range of 0.65-1.5 cm³/g, 0.7-1.3 cm³/g, 0.8-1.2 cm³/g, 0.9-1.1 cm³/g, or about 0.98 cm³/g, and the mesopore volume is in a range of 0.15-0.5 cm³/g, 0.17-0.4 cm³/g, 0.19-0.3 cm³/g, 0.2-0.26 cm³/g, or about 0.23 cm³/g.

The carbide-derived carbon particles may be deposited onto a surface of the aforementioned intermediate layer (i.e. the polymeric matrix having reacted units of the polyfunctional acyl halide and polydopamine). In one embodiment, the carbide-derived carbon particles are adsorbed on the surface (e.g. by van der Waals and/or electrostatic forces) of the intermediate layer. In an embodiment where the carbide-derived carbon particles are well separated (i.e. not agglomerated), the carbide-derived carbon particles may be evenly deposited (i.e., a distance between a carbide-derived carbon particle and all its neighbors is the same or substantially the same) or randomly deposited (i.e., the distance between a carbide-derived carbon particle and all its neighbors are different). The distance can be said to be substantially the same when the shortest distance is at least 80%, at least 85%, at least 90%, or at least 95% of the average distance and the longest distance is not more than 120%, not more than 110%, or not more than 105% of the average distance. The distance is measured from a center of a carbide-derived carbon particle to a neighboring carbide-derived carbon particle and may be in a range of 0.01-10 nm, 0.1-5 nm, or 0.5-2 µm. Energy-dispersive X-ray spectroscopy, X-ray microanalysis, elemental mapping, transmission electron microscopy, scanning electron microscopy, and scanning transmission electron microscopy may be useful techniques for observing the deposition of the carbide-derived carbon particles on the intermediate layer.

In certain embodiments, the carbide-derived carbon particles partially penetrate the intermediate layer. For example, up to 20 wt %, preferably 0.01-15 wt %, preferably 0.1-10 wt %, preferably 1-5 wt % of the carbide-derived carbon particles are embedded (i.e. dispersed) in the intermediate layer, relative to a total weight of the carbide-derived carbon particles.

The carbide-derived carbon particles used herein may be prepared in-house according to methods known to one of ordinary skill in the art. For example, the carbide-derived carbon particles may be prepared by the following method via a gas phase reaction.

The aforementioned metal carbides, such as titanium carbide, or any other carbide or combination of carbides used, may be heated at a heating rate ranging from 1-50° C./min, preferably 5-25° C./min, more preferably 8-15° C./min, or about 10° C./min. However, in other embodiments, heating rates of lower than 1° C./min or greater than 50° C./min may be used successfully. The heating may comprise one or more heating steps. In a preferred embodiment, the heating consists of only one heating step.

The metal carbide(s) may be reacted with chlorine gas ($Cl_2$) at a temperature in a range of 400-1,200° C., preferably 600-1,000° C., more preferably 700-900° C., or about 800° C., thereby forming the carbide-derived carbon particles. The chlorine gas may be introduced at a flow rate of 1-100 mL/min, preferably 5-50 mL/min, more preferably 10-20 mL/min. In a related embodiment, the reacting is performed at the above specified temperature with a holding time in a range of 1-8 hours, preferably 2-6 hours, more preferably 2.5-4 hours, even more preferably about 3 hours. As used herein, the term "holding time" refers to the duration for which the reactants (e.g. metal carbide(s), chlorine gas) are exposed to an isothermal heating at the above specified temperature, or at the specified temperature within a small temperature variation range, preferably within ±10° C., more preferably within ±5° C., most preferably within ±1° C. Preferably, the reacting is performed in an inert atmosphere, preferably provided by argon, helium, and/or nitrogen gas within a furnace or an oven, preferably a quartz tubular furnace.

It is equally envisaged that other halogens such as fluorine ($F_2$), vaporized and/or liquid bromine ($Br_2$), and vaporized, solid, and/or liquid iodine ($I_2$), halide containing compounds such as hydrogen chloride (HCl), hydrogen bromide (HBr), and any mixtures thereof may be used in addition to or in lieu of the chlorine gas.

The method of preparing the carbide-derived carbon particles may further involve a de-chlorinating treatment to remove residual chlorine trapped in the pores of the carbon particles during the reacting step. For example, the resulting carbide-derived carbon particles may be treated with hydrogen gas ($H_2$) and/or ammonia ($NH_3$) at a temperature of 100-800° C., 250-600° C., or 300-500° C. for 0.5-4 hours, 1-3 hours, or 1.5-2 hours within the furnace or oven.

The hydrogen or ammonia gas may be replaced with an inert gas (e.g. nitrogen, argon, helium) by flushing the furnace or oven with a stream of the inert gas. The inert gas may serve a dual purpose of removing the excess residues of gaseous by-products (e.g. $TiCl_4$) from the carbide-derived carbon particles, and cooling the temperature of the furnace or oven to about 10-35° C., about 15-30° C., or about 20-25° C.

Carbon nanotubes (CNTs) are members of the fullerene family. The name refers to their long, hollow structure with the "walls" formed by one-atom-thick sheets of carbon, called graphene. These sheets are rolled at specific and discrete ("chiral") angles, and the combination of the rolling angle and radius determines the nanotube properties. Individual nanotubes naturally align themselves into "ropes" held together by van der Waals forces and pi-stacking. Nanotubes are categorized as single-walled carbon nanotubes (SWCNTs) and multi-walled carbon nanotubes (MWCNTs). Multi-walled nanotubes consist of multiple rolled layers (concentric tubes) of graphene. Single-walled nanotubes typically have a diameter of close to 1 nm and a tube length of up to many millions of times longer. The structure of a single-walled nanotube can be conceptualized by wrapping a one-atom-thick layer of graphite called graphene into a seamless cylinder.

In one embodiment, the composite membrane of the present disclosure contains substantially no carbon nanotubes, for instance, less than 0.1 wt % of carbon nanotubes, preferably less than 0.05 wt %, more preferably less than 0.01 wt % of carbon nanotubes, relative to a total weight of the membrane. In at least one embodiment, the composite membrane is devoid of carbon nanotubes. Preferably, the carbide-derived carbon particles (e.g. TiC-derived carbon particles) are not in the form of carbon nanotubes.

The composite membrane of the present disclosure further includes a porous support layer containing a polysulfone, wherein the aforementioned intermediate layer is disposed on at least a portion of a surface of the porous support layer.

As used herein, "disposed" generally indicates the situation where the intermediate layer directly contacts a surface of the porous support layer as a surface layer without sagging into the pores of the porous support layer. In certain embodiments, the porous support layer may be partially filled with the intermediate layer. The intermediate layer may interact with the surface and/or the pores of the porous support layer via hydrogen bonding interactions, van der Waals forces, and/or π-π stacking (for polymers containing an awl group such as phenyl, naphthyl, and indolyl (e.g. polydopamine and polysulfone)).

In a preferred embodiment, the composite membrane disclosed herein is an asymmetric membrane, and the porous support layer is coated by the intermediate layer on the side that will be exposed to a feed fluid when the membrane is in use. The intermediate layer preferably covers greater than 25%, greater than 40%, greater than 50%, greater than 60%, greater than 70%, greater than 80%, greater than 90%, greater than 95%, greater than 97%, greater than 99%, greater than 99.5% of the surface of the porous support layer which is on the feed side when the composite membrane is in use. As defined herein, the surface area of the porous support layer primarily consists of the outer surface(s) of the porous support but excludes the pore surface of the porous support. In a related embodiment, the intermediate layer is deposited by the carbide-derived carbon particles on the side that will be exposed to a feed fluid when the membrane is in use.

In one embodiment, a thickness of the porous support layer is 20-1,000 μm, preferably 50-800 μm, more preferably 100-600 μm, even more preferably 200-400 μm, or about 300 μm. In terms of pore size, the porous support layer can have pores with an average diameter in a range of 10 nm to 10 μm, 50 nm to 5 μm, 100 nm to 1 μm, or 200-500 nm in diameter. The pore sizes of the porous support layer should be sufficiently large so that a permeate can pass through without reducing the permeability of the composite membrane. However, the pores of the porous support layer should not be large enough so as to interfere with the bridging over of the intermediate layer formed thereon.

Non-limiting examples of polysulfone applicable to the present disclosure include polysulfones (e.g. poly(1,4-phenylene ether-ether-sulfone), poly(l-hexadecene-sulfone), poly(1-tetradecene-sulfone), poly(oxy-1,4phenylenesulfonyl-1,4-phenylene), poly(oxy-1,4-phenylenesulfonyl-1,4-phenylene), poly(oxy-1,4-phenylenesulfonyl-1,4-phenylene), poly(oxy-1,4-phenylenesulfonyl-1,4-phenylene)), polysulfonamides (e.g., poly[1-[4-(3-carboxy-hydroxyphenylazo)benzenesulfonamido]-1,2-ethanediyl], sulfonated derivatives thereof, and mixtures thereof.

As used herein, a degree of polymerization is defined as the number of monomeric units in a macromolecule or polymer.

In a preferred embodiment, the polysulfone used herein is polyethersulfone (PES) of formula (I)

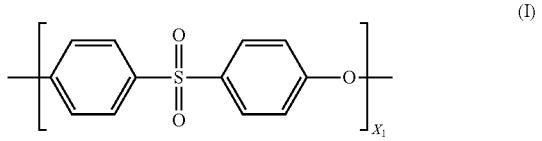

(I)

wherein the degree of polymerization $X_1$ is in a range of from 100 to 100,000, 150 to 75,000, 200 to 50,000, 250 to 40,000, 300 to 30,000, 400 to 20,000, 500 to 10,000, 750 to 7,500, or 1,000 to 5,000.

In an alternative embodiment, the polysulfone is polysulfone (PSU) of formula (II)

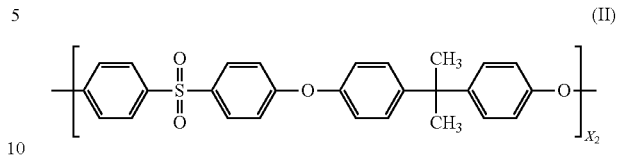

(II)

wherein the degree of polymerization $X_2$ is in a range of from 100 to 100,000, 150 to 75,000, 200 to 50,000, 250 to 40,000, 300 to 30,000, 400 to 20,000, 500 to 10,000, 750 to 7,500, or 1,000 to 5,000.

In another alternative embodiment, the polysulfone is polyphenylsulfone (PPSU) of formula (III)

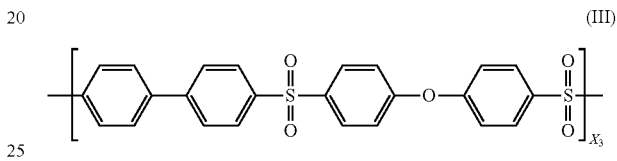

(III)

wherein the degree of polymerization $X_3$ is in a range of from 100 to 10,000, 150 to 7,500, 200 to 50,000, 250 to 40,000, 300 to 30,000, 400 to 20,000, 500 to 10,000, 750 to 7,500, or 1,000 to 5,000.

Some of the techniques for measuring molecular weight of polymeric products are based on measuring sedimentation, light scattering, osmometry, NMR spectroscopy, ebulliometry, and size exclusion chromatography for determining absolute molecular weight distribution. By the use of these methods, molecular weight parameters such as number average ($M_n$), viscosity average ($M_v$), and weight average ($M_w$) molecular weights can be determined.

In a preferred embodiment, the polysulfone of the present disclosure has a weight average molecular weight ($M_w$) ranging from 10,000 g/mol to 500,000 g/mol, preferably 15,000 g/mol to 300,000 g/mol, preferably 20,000 g/mol to 100,000 g/mol, preferably 25,000 g/mol to 80,000 g/mol, preferably 30,000 g/mol to 60,000 g/mol, or about 35,000 g/mol.

As used herein, the polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. The polysulfone may have a polydispersity index (PDI, a measure of the width of molecular weight distribution) in a range of 1 to 10, 1.5 to 8, 1.7 to 6, or 1.9 to 4.

Other polymers that can be used in addition to or in lieu of the polysulfone include, but are not limited to, polyamide (PA), polyaramide (PAA), polycarbonate (PC), polyether, polyurethane (PU), polyacrylonitrile (PAN), polyetherimide, copolymers thereof, and mixtures thereof.

The present disclosure further relates to a method for removing a hydrocarbon from an aqueous sample using the composite membrane described herein, as well as oil (i.e. hydrocarbons)-water separation/filtration/treatment devices and systems incorporating one or more of the composite membranes. The method involves delivering the aqueous sample having an initial concentration of the hydrocarbon into a feed side of a chamber containing the composite membrane of the first aspect that divides the chamber into the feed side and a permeate side, and collecting from the permeate side an aqueous sample having a reduced concentration of the hydrocarbon compared to the initial concentration.

In one embodiment, the method involves filtering the aqueous sample through the composite membrane. The aqueous sample may or may not be pre-treated, for instance, by pre-filtering through a coarse filter to remove large particulate matter, by centrifuge, or by exposure to UV light or ozone. During the filtering, a proportion of the material in the feed which is smaller than the composite membrane pore size passes through the membrane as a purified fluid, which may also be termed as permeate or filtrate; everything else that does not pass through the membrane is retained on the feed side of membrane as retentate, and may be also called reject fluid or concentrate.

The difference in pressure between the feed and permeate sides of a membrane is defined herein as "transmembrane pressure". In one embodiment of the filtering, a transmembrane pressure of the composite membrane is in a range of 1-800 kPa, 10-600 kPa, 25-500 kPa, 50-450 kPa, 75-400 kPa, 100-350 kPa, 150-300 kPa, or 200-250 kPa. Here, the transmembrane pressure may be created solely by the weight of the aqueous sample on the feed side meaning that the filtration is gravity driven. Alternatively, the transmembrane pressure may be created by a pump, a vacuum pump, a piston, a compressed gas, centrifugation, evaporation, or water jet aspiration. Preferably the transmembrane pressure is constant, though in alternative embodiments, the transmembrane pressure may be varied.

As used herein, the term "water flux" or "flux" refers to the volume of fluid (e.g., purified water) flowing through a given membrane area during a given time. Hydrophilicity, porosity, transmembrane pressure, as well as operating temperature are factors impacting water flux or transport through a membrane. In general, the more hydrophilic a membrane is, the higher the water flux is. Similarly, in general, high porosity leads to high water flux of the membrane. An increase in transmembrane pressure usually boosts the water flux of a membrane. In one embodiment, a suitable operation temperature for the composite membrane ranges from 4-80° C., preferably 10-60° C., preferably 15-50° C., preferably 20-40° C., preferably 25-30° C.

In one embodiment, the composite membrane of the present disclosure exhibits a water flux of 100-400 mLm$^{-2}$s$^{-1}$ (milliliter of permeate or purified fluid produced in 1 second per 1 m$^2$ of the membrane), preferably 120-290 mLm$^2$s$^{-1}$, preferably 140-250 mLm$^{-2}$s$^{-1}$, preferably 150-225 mLm$^{-2}$s$^{-1}$, preferably 160-200 mLm$^{-2}$s$^{-1}$, preferably 170-180 mLm$^{-2}$s$^{-1}$, at a transmembrane pressure of 150-450 kPa, 200-400 kPa, 250-350 kPa, or about 300 kPa.

The filtering process may be a dead-end filtration, or a crossflow filtration. Crossflow filtration means that a feed fluid (i.e. the aqueous sample to be filtered) is passed across the composite membrane (tangentially) at positive pressure relative to a permeate side. Dead-end filtration indicates that the feed fluid is applied perpendicular to the composite membrane from the feed side, and a permeate elutes and exists from the permeate side of the membrane. Crossflow filtration can be a continuous process, while dead-end filtration is a batch-wise or semi-continuous process. The membrane testing setup illustrated by FIG. 1 is an example of a filtration device that tests membranes under dead-end filtration conditions. In at least one embodiment, the method disclosed herein involves a dead-end filtration.

The chamber used for removing hydrocarbons from the aqueous sample may be of any shape so long as the composite membrane can be securely housed and utilized inside the chamber to accomplish the filtration. For example, the chamber may be a cylindrical membrane module (see FIG. 1). The chamber may also include an inlet configured to accept feed fluid, and an outlet configured to expel a permeate. The chamber can be configured to be pressurized so as to push feed fluid though the inlet, and permeate through the outlet. The chamber may also include a vacuum pump to provide vacuum or a reduced pressure to the permeate side. Further, it is contemplated that at least 2, 3, 4 or more of the same or different composite membranes disclosed herein may be used in series with one another. Similarly, the composite membranes may be used in series with other currently known membranes.

Examples of hydrocarbon that can be removed by the method disclosed herein with the composite membrane include, but are not limited to, diesel oil, petroleum oil, fuel oil, biodiesel, biomass to liquid (BTL) fuel, gas to liquid (GTL) diesel, mineral oil, an ester, an alpha-olefin, vegetable oil, kerosene, naphtha, terpenes, aromatic or aliphatic hydrocarbons containing four or greater carbon atoms, isoparaffinic hydrocarbons (e.g. isopar L, isopar C, isopar E, isopar G, isopar H, isopar K, isopar M, isopar V), and derivatives and/or combinations thereof. In a preferred embodiment, the hydrocarbon present in the aqueous sample is diesel.

In one embodiment, the aqueous sample may be a contaminated water mixture. The water mixture may come from petroleum extraction or processing. In other embodiments, the contaminated water mixture may come from an ocean, a bay, a river, a lake, a swamp, a pond, a pool, a fountain, a bath, an aquarium, a water treatment plant, a sewage treatment plant, a desalination plant, a manufacturing plant, a chemical plant, a textile plant, a power plant, a gas station, a food processing plant, a restaurant, a dry cleaners, or some other place that may generate contaminated water mixtures, or contaminated oil-water mixtures. In some embodiments, the contaminated water mixture may be in the form of an emulsion.

Other organic contaminants present in an aqueous sample that can be removed by the method include, but are not limited to, an herbicide, a fungicide, a pesticide, a pharmaceutical compound, a steroid, a microbial toxin, a metabolite, a disinfection byproduct, an arsenic-containing compound, a food byproduct, a dye, or some other organic molecule. Preferably the organic contaminant is one or more unwanted compounds known as an environmental pollutant.

As used herein, "parts per million" or "ppm" refers to an expression of concentration by mass or weight. For example, 1 ppm of a hydrocarbon denotes a 1:1,000,000 weight ratio of the hydrocarbon per total weight of fluid (e.g. the aqueous sample).

In one embodiment, the aqueous sample comprises the hydrocarbon at an initial concentration of 1-4,000 ppm, preferably 10-3,000 ppm, more preferably 100-2,000 ppm, even more preferably 200-1,000 ppm relative to a total weight of the aqueous sample. The hydrocarbon may be emulsified or dispersed throughout the aqueous sample, may float at the top of the aqueous sample, or some combination of both.

The oil rejection performance of the composite membrane is generally independent on the initial concentration of the hydrocarbon present in the aqueous sample. In a related embodiment, the aqueous sample has an initial concentration of the hydrocarbon (e.g. diesel oil) in a range of 100-2,000 ppm, preferably 200-1,500 ppm, preferably 300-1,200 ppm, preferably 400-1,000 ppm, preferably 500-800 ppm, preferably 600-700 ppm, and greater than 75% of a total amount of the hydrocarbon is removed from the aqueous sample, preferably greater than 80%, more preferably greater than 85%, even more preferably greater than 90% of the hydrocarbon is removed from the aqueous sample (see FIG. 6).

Figure 5:
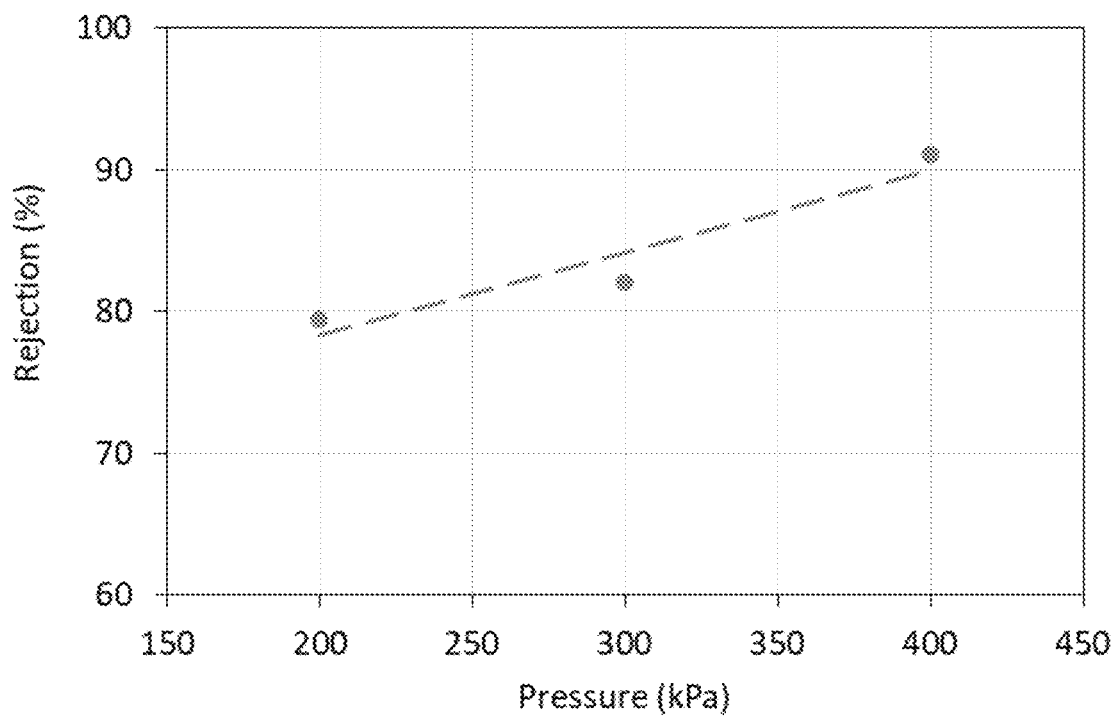
FIG. 5 is a graph showing the relationship of oil rejection rate and transmembrane pressure of composite membrane.

The oil rejection performance of the composite membrane may depend on a transmembrane pressure, and an increase in transmembrane pressure usually boosts the oil rejection rate (see FIG. 5). In one embodiment, a total amount of the hydrocarbon removed from the aqueous sample with the composite membrane at a transmembrane pressure of 350-450 kPa, 375-425 kPa, or about 400 kPa is at least 10% greater, preferably 12-20% greater, more preferably 14-16% greater than that removed from the aqueous sample with the composite membrane at a transmembrane pressure of 150-250 kPa, 175-225 kPa, or about 200 kPa.

According to a further aspect, the present disclosure relates to a method of making the composite membrane. The method involves the steps of (i) casting a first solution comprising dopamine onto at least a portion of a surface of the porous support layer to form a polydopamine layer disposed on the porous support layer, (ii) depositing the carbide-derived carbon particles onto a surface of the polydopamine layer to form a deposited polydopamine layer disposed on the porous support layer, and (iii) reacting the deposited polydopamine layer and a second solution comprising the polyfunctional acyl halide, thereby forming the composite membrane.

The porous support layer used herein may be commercially available or prepared in-house according to methods known to one of ordinary skill in the art, such as wet phase inversion method, vapor-induced phase separation, thermally induced phase inversion, heavy-ion irradiation, and stretching of a melt-processed semi-crystalline polymer substrate. In at least one embodiment, the porous support layer is a MicroPES® 12F membrane commercially available from Membrana GmbH, Germany.

The polydopamine layer may be formed by casting a first solution containing dopamine on at least a portion of a surface of the porous support layer. Preferably, the casting is performed on the side of the porous support layer that will be exposed to a feed fluid when the composite membrane is in use. In one embodiment, the polydopamine layer covers greater than 25%, greater than 40%, greater than 50%, greater than 60%, greater than 70%, greater than 80%, greater than 90%, greater than 95%, greater than 97%, greater than 99%, greater than 99.5% of the surface of the porous support layer which is on the feed side when the composite membrane is in use.

The dopamine may be dissolved in a polar solvent, preferably water, to form the first solution prior to the casting. The water used herein may be tap water, distilled water, bidistilled water, deionized water, deionized distilled water, reverse osmosis water, and/or some other water. In one embodiment, the water is bidistilled to eliminate trace metals. Preferably the water is distilled, bidistilled, deionized, deionized distilled, or reverse osmosis water. Other polar solvents including, but not limited to, methanol, ethanol, 1-propanol, benzyl alcohol, dimethyl sulfoxide (DMSO), and dimethylformamide (DMF) may be used in addition to or in lieu of water. The resulting first solution may comprise about 0.1-10 g/L, preferably about 0.5-8 g/L, more preferably about 1-5 g/L, or about 2 g/L of dopamine relative to a total volume of the first solution.

A suitable pH level for the polymerization of dopamine may be within a slightly basic range. In one embodiment, the first solution has a pH of 7-10, preferably 7.5-9.5, more preferably 8-9. The pH of the first solution may be adjusted by an appropriate buffer, preferably a Tris base buffer prepared from tris(hydroxymethyl)aminomethane and deionized water.

The polymerization of dopamine may be catalyzed in the presence of transition metal cations (e.g. copper(II), nickel (II), zinc(II)) and/or oxidants (e.g. hydrogen peroxide, potassium chlorate, ammonium persulfate, sodium periodate).

In one embodiment, a copper(II) salt is present in the first solution in an amount of 0.1-5 g/L, preferably 0.2-2 g/L, more preferably 0.4-1 g/L, or about 0.8 g/L relative to a total volume of the first solution. Non-limiting examples of the copper(II) salt include copper(II) nitrate, copper(II) chloride, copper(II) sulfate, copper(II) bromide, copper(II) iodide, and mixtures thereof. The copper(II) salt used herein may be in any hydration state, for instance, copper(II) sulfate includes, without limitation, $Cu(SO_4)_2$, and $Cu(SO_4)_2 \cdot 5H_2O$, and copper(II) nitrate includes, without limitation, $Cu(NO_3)_2$, $Cu(NO_3)_2 \cdot H_2O$, $Cu(NO_3)_2 \cdot 2.5H_2O$, $Cu(NO_3)_2 \cdot 3H_2O$, and $Cu(NO_3)_2 \cdot 6H_2O$. In a preferred embodiment, the copper(II) salt used herein is copper(II) sulfate. In another embodiment, hydrogen peroxide is present in the first solution in an amount of 0.05-4 g/L, preferably 0.1-2 g/L, more preferably 0.3-1 g/L, or about 0.6 g/L relative to a total volume of the first solution. In a most preferred embodiment, the first solution contains the copper (II) salt and hydrogen peroxide.

To fabricate the polydopamine layer, the first solution may be cast by a continuous single step extrusion film process, flow coating, spin coating, or solvent casting. In one embodiment, the method further involves drying the polydopamine layer disposed on the porous support layer prior to the depositing. In one embodiment, the polydopamine layer is dried in an oven at a temperature of 25-125° C., preferably 30-100° C., more preferably 45-80° C., or about 75° C. for 0.1-24 hours, 0.2-12 hours, 0.5-6 hours, or 1-3 hours.

The previously specified carbide-derived carbon particles may be deposited onto the polydopamine layer by dropping the particles onto the polydopamine layer, spraying the particles onto the polydopamine layer, filtration-assisted depositing the particles onto the polydopamine layer, or other known techniques.

The carbide-derived carbon particles are preferably mixed with a polar solvent, preferably water, to form a suspension prior to the dispersing. In one embodiment, the suspension contains 1-200 mg/L, preferably 5-100 mg/L, more preferably 10-50 mg/L, or about 20 mg/L of the carbide-derived carbon particles relative to a total volume of the suspension.

In a preferred embodiment, the depositing is performed by filtering the suspension containing the particles through the polydopamine layer disposed on the porous support layer. The filtering may be performed at a pressure difference across the feed side to the permeate side in a range of 100-2,000 kPa, preferably 200-1,500 kPa, more preferably 400-1,000 kPa, or about 800 kPa, using a dead-end filtration apparatus. The polydopamine layer disposed on the porous support layer may be attached within the filtration apparatus, and the filtering is performed on the side of the polydopamine layer (i.e. the suspension is deposited onto the polydopamine layer). The filtering process allows at least a portion of the particles in the suspension to be retained and deposited onto the polydopamine layer, thereby forming a deposited polydopamine layer disposed on the porous support layer. In certain embodiments, the filtering process also allows the carbide-derived carbon particles partially penetrate the polydopamine layer. The polar solvent (e.g. water) may elute and exit as a permeate. If excessive polar solvent exists, the deposited polydopamine layer may be optionally dried at a temperature of 40-100° C., 60-80° C., or about 75° C. for 1-60 minutes, 3-30 minutes, or 5-10 minutes. Alternatively, excess polar solvent can be optionally removed by a rubber roller, a sponge, an air knife, a rubber wiper blade, or other suitable devices.

The composite membrane may be formed by reacting the deposited polydopamine layer and a second solution comprising the polyfunctional acyl halide via an interfacial polymerization process. The polyfunctional acyl halide may be dissolved in a non-polar solvent to form the second solution prior to the reacting. Non-polar solvents used herein should be capable of dissolving the polyfunctional acyl halide and are immiscible with the aforementioned polar solvent (e.g. water). Examples of the non-polar solvent include, but are not limited to, $C_5$-$C_7$ hydrocarbons such as pentane, cyclopentane, hexane, cyclohexane, benzene, and toluene, $C_5$-$C_{24}$ hydrocarbons, and mixtures thereof. In a preferred embodiment, the non-polar solvent used herein is hexane. The second solution may comprise about 0.01-10 wt %, preferably about 0.05-5 wt %, more preferably about 0.1-1 wt %, or about 0.2 wt % of the polyfunctional acyl halide relative to a total weight of the second solution.

The aforementioned second solution may be contacted, for example, by immersing, dipping, spraying, or vapor deposition, with the deposited polydopamine layer and allowed to remain in place for a period from about 5 seconds to about 15 minutes, preferably about 30 seconds to about 10 minutes, more preferably about 1 to about 7 minutes, or about 5 minutes. Typically, a non-polar phase (e.g. hexane) is immiscible with a polar phase (e.g. polydopamine), so that the reaction can occur at the interface between the two phases. Preferably, a crosslinking polymerization occurs at the interface between the polar phase comprising the carbide-derived carbon particles dispersed in a polydopamine layer and the nonpolar phase comprising trimesoyl chloride, thereby forming the composite membrane.

The resulting composite membrane may be optionally washed thoroughly with a nonpolar solvent, such as hexane, and dried in an oven, preferably in a muffle furnace at a temperature of 50-120° C., 55-100° C., 60-90° C., or about 75° C. for 30 seconds to 30 minutes, 1-20 minutes, 5-15 minutes, or about 10 minutes.

The examples below are intended to further illustrate protocols for preparing, characterizing, and utilizing the composite membrane, and are not intended to limit the scope of the claims.

Example 1

Preparation of Carbide-Derived Carbon (CDC)

Titanium carbide (TiC) was placed in a quartz tubular furnace. The furnace was then purged with Argon gas and heated from room temperature to 800° C. at a heating rate of 10° C./min. When the desired temperature was reached, pure chlorine gas ($Cl_2$) was allowed to flow into the furnace at a flow rate of (10 $cm^3$/min) for 3 hours. After chlorination, the flowing of chlorine gas was stopped and hydrogen gas was allowed to flow into the furnace for 1 hour. To complete the CDC production process, the furnace was allowed to cool down to room temperature with a continuous flow of Argon gas.

Example 2

Membrane Preparation

A circular microfiltration support (Polyethersulfone) with a diameter of 47 mm was soaked in isopropyl alcohol for 30 min and then thoroughly rinsed with distilled water. Subsequently, polydopamine was rapidly deposited onto the microfiltration support via soaking the support with a dopamine solution for 30 minutes at 40° C. The dopamine solution was prepared by dissolving 0.2 g dopamine, 0.62 g Tris buffer, 0.08 g of copper sulfate catalyst, and 0.2 g of hydrogen peroxide (30 wt %) in 100 mL of distilled water. After polydopamine deposition, the support was dried in oven at 75° C. for 10 minutes. Then, the support was fixed in a dead end filtration apparatus and 180 mL of CDC solution (20 mg/L of CDC in distilled water) was filtered at a pressure of 800 kPa to prepare the CDC membrane. The CDC membrane was dried at 75° C. for 5 min, cross-linked in trimesoyl chloride solution (0.2 wt % in hexane) for 5 minutes, and then dried again at 75° C. for 10 minutes to complete the crosslinking.

Example 3

Membrane Testing

A dead end filtration setup (FIG. 1) was used to test the permeability and rejection rate of the prepared membrane under various conditions. A stock solution of oily water was prepared by dissolving 1 g of diesel oil, 0.3 g of sodium dodecyl sulfate (SDS) in 1 L of distilled water. The stock solution was vigorously mixed for 24 hours using a magnetic stirrer and then sonicated for 15 minutes using a probe sonicator. Subsequently, a portion of the stock solution of oil water (1000 ppm) was diluted to prepare different solutions having diesel oil concentrations of 750 ppm, 500 ppm, and 250 ppm, respectively.

The previously prepared CDC membrane was fixed in a stirred cell, which was then filled with 200 mL of the oily water solution. The oily water was pressurized by a gas cylinder at the required pressure (200-400 kPa), while being stirred by the magnetic stirrer at 500 rpm. The outlet permeate was collected in a graduated cylinder and monitored at different time intervals.

Example 4

Results and Discussion: Membrane Morphology

Figure 2:
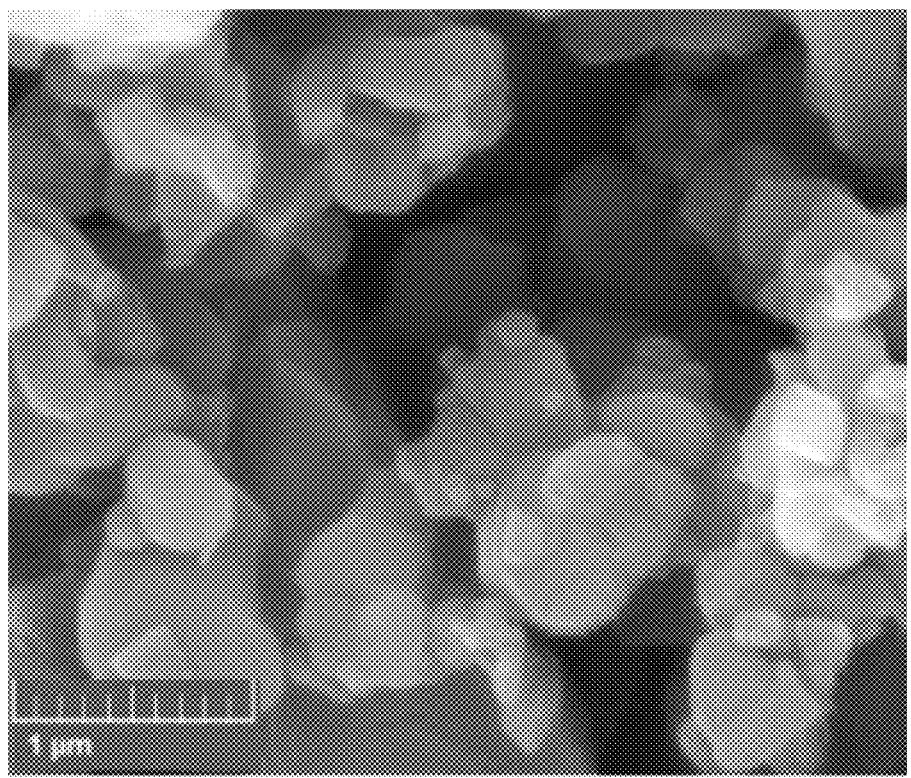
FIG. 2 is a scanning electron microscopy (SEM) image (scale bar: 1 μm) of TiC-derived carbon particles.
Figure 3:
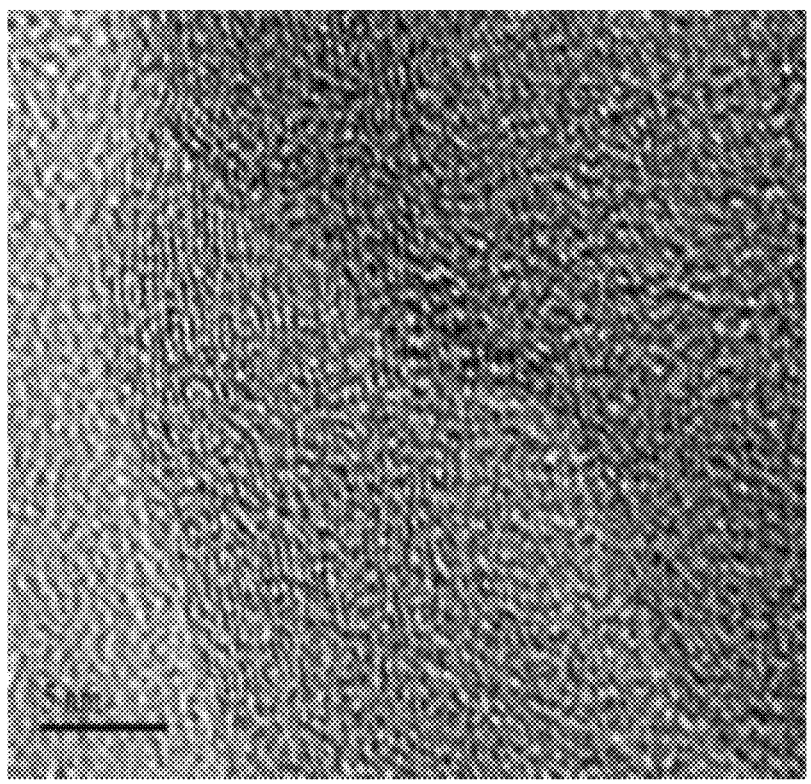
FIG. 3 is a transmission electron microscopy (TEM) image (scale bar: 5 nm) of TiC-derived carbon particles.

The scanning electron microscopy (SEM) image (FIG. 2) shows the morphology of the prepared CDC layer. Aggregates of sub-micron CDC particles with a smooth surface were observed by the SEM image. The transmission electron microscopy (TEM) image (FIG. 3) of the prepared CDC layer showed that the CDC membrane included a mixture of amorphous and ordered graphitized carbon. Further analysis (Table 1) using Nitrogen adsorption/desorption revealed that the CDC layer had a BET surface area of 2589 $m^2$/g and a pore volume of 1.22 $cm^3$/g. The large surface area and high porosity of the CDC layer are significant parameters to ensure effective separations of the membrane.

TABLE 1

| Properties of the prepared CDC | | | |
|---|---|---|---|
| BET Surface area ($m^2/g$) | $V_t$ ($cm^3/g$) | $V_{micro}$ ($cm^3/g$) | $V_{meso}$ ($cm^3/g$) |
| 2589 | 1.22 | 0.98 | 0.23 |

Example 5

Results and Discussion: Membrane Filtration Performance

Figure 4:
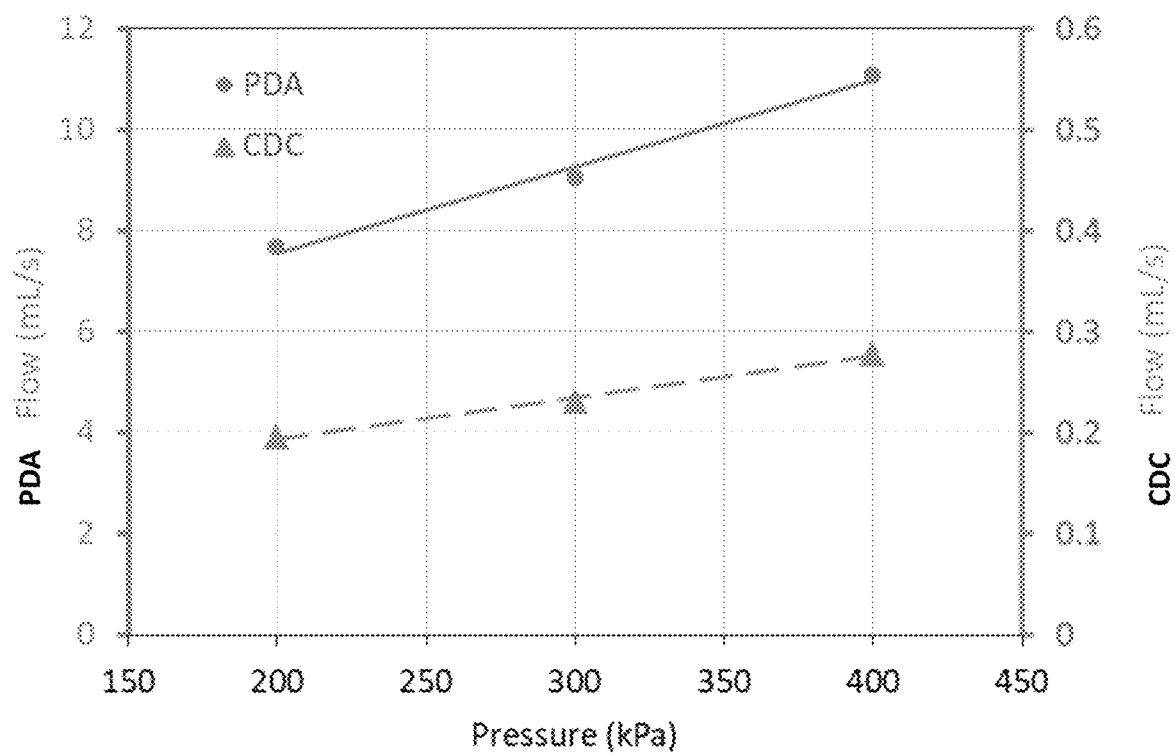
FIG. 4 is an overlay of water flow values of a composite membrane (CDC) and a membrane coated with a polydopamine layer (PDA), respectively, at various transmembrane pressures.

Filtration experiments were performed on the membrane using the apparatus shown in FIG. 1 at different testing conditions. FIG. 4 shows the permeations of water of the polydopamine coated support (without CDC layer) and the final CDC membrane (with the CDC layer), respectively.

Because of the additional mass-transfer resistance introduced by the CDC layer, water permeation of the CDC membrane was lower than that of the polydopamine coated support. However, this reduction in permeability was accompanied by a drastic increase in the oil rejection.

Figure 6:
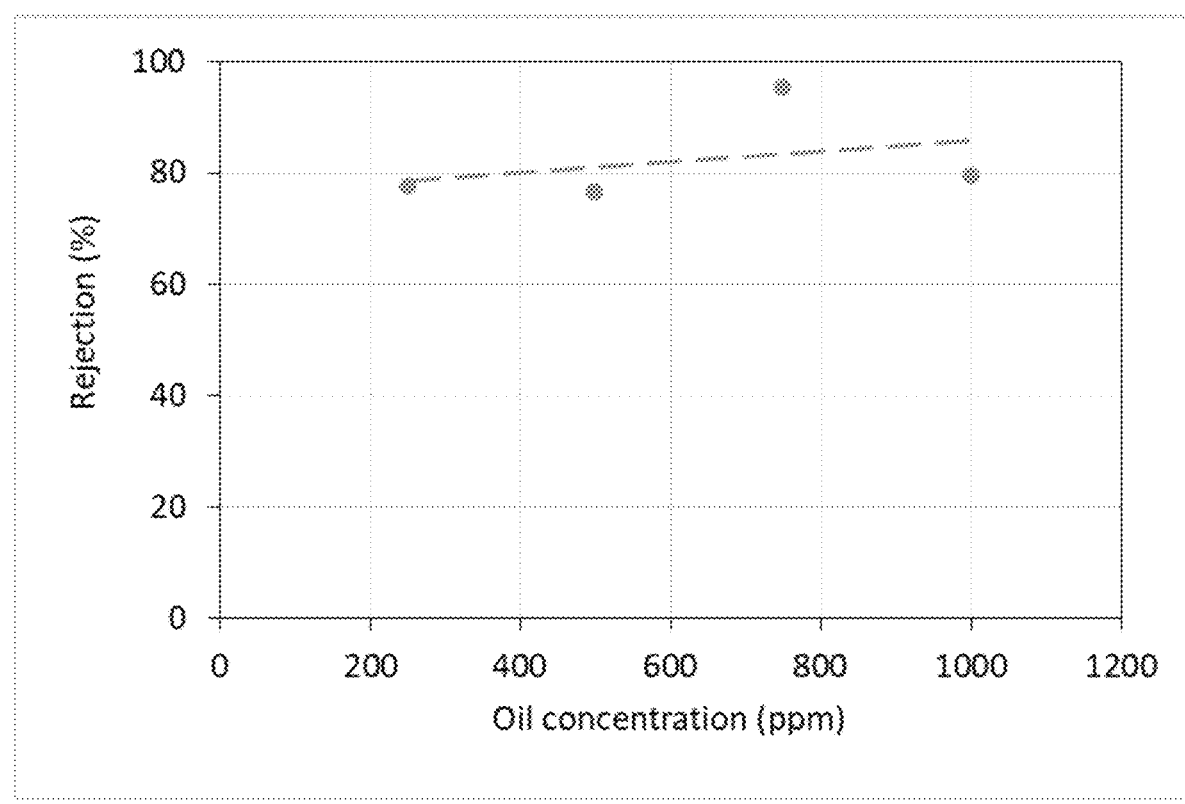
FIG. 6 is a graph showing oil rejection rates after treating aqueous samples having different initial concentrations of hydrocarbons with composite membrane.

FIG. 5 shows the oil rejection of the CDC membrane at different pressures when the feed water contained 1000 ppm of oil. The oil rejection rate increased from 79% to 91% when the pressure increased from 200 kPa to 400 kPa. The effect of oil concentration in the feed water on oil rejection rate of the CDC membrane was also studied. As shown in FIG. 6, it was revealed that the CDC membrane demonstrated a stable and consistent oil rejection of about 80% at a constant pressure of 200 kPa with varying oil concentrations (200-1,000 ppm) in the feed water.

Example 6

The present disclosure relates to the preparation of a cross-linked carbide-derived-carbon (CDC) composite membrane comprising a polyethersulfone support as a first layer which is coated with polydopamine as a binding intermediate, and an ultrathin second layer of cross-linked CDC. The second layer was deposited on the surface of the first layer by pressure-assisted filtration of a dilute solution of CDC. The cross-linking was accomplished by soaking the membrane in trimesoyl chloride (TMC) solution and subsequent heating for complete crosslinking. The CDC membrane demonstrated excellent separation performance in removing oil from water with up to 91% oil rejection.

The invention claimed is:

1. A composite membrane, comprising:
   a porous support layer comprising a polysulfone;
   an intermediate layer comprising reacted units of a polyfunctional acyl halide having at least two acyl halide groups and polydopamine; and
   TiC-derived carbon particles deposited onto a surface of the intermediate layer,
   wherein
   the intermediate layer is disposed on at least a portion of a surface of the porous support layer; and
   the TiC-derived carbon particles have a BET surface area of 2,200-3,000 $m^2/g$.

2. The composite membrane of claim 1, wherein the polysulfone is a polyethersulfone.

3. The composite membrane of claim 1, wherein the TiC-derived carbon particles have a pore volume of 0.9-1.8 $cm^3/g$.

4. The composite membrane of claim 1, wherein the polyfunctional acyl halide is a polyfunctional acyl chloride.

5. The composite membrane of claim 1, wherein the polyfunctional acyl halide is at least one selected from the group consisting of trimesoyl chloride, 1,2,4-benzenetricarbonyl trichloride, 1,2,4,5-benzenetetracarbonyl tetrachloride, isophthaloyl chloride, terephthaloyl chloride, and [1,1'-biphenyl]-4,4'-dicarbonyl dichloride.

6. The composite membrane of claim 1, wherein the polyfunctional acyl halide is trimesoyl chloride.

7. The composite membrane of claim 1, wherein the TiC-derived carbon particles are present in an amount ranging from 0.01 wt % to 4 wt % relative to a total weight of the intermediate layer.

8. The composite membrane of claim 1, which has a water flow of 0.2-0.5 mL/s, determined by exposing the composite membrane to water at a transmembrane pressure of 150-450 kPa.

9. A method of making the composite membrane of claim 1, the method comprising:
   casting a first solution comprising dopamine onto at least a portion of a surface of the porous support layer to form a polydopamine layer disposed on the porous support layer;
   depositing the TiC-derived carbon particles onto a surface of the polydopamine layer to form a deposited polydopamine layer disposed on the porous support layer; and
   reacting the deposited polydopamine layer and a second solution comprising the polyfunctional acyl halide thereby forming the composite membrane.

10. The method of claim 9, wherein the first solution further comprises a polar solvent.

11. The method of claim 9, wherein dopamine is present in an amount of 0.1-10 g/L relative to a total volume of the first solution.

12. The method of claim 9, wherein the first solution has a pH of 7-10.

13. The method of claim 9, further comprising drying the polydopamine layer disposed on the porous support layer at a temperature of 25-125° C. for 0.1-24 hours prior to the depositing.

14. The method of claim 9, wherein the second solution further comprises a non-polar solvent.

15. The method of claim 9, wherein the polyfunctional acyl halide is present in an amount of 0.01-1 wt % relative to a total weight of the second solution.

16. A method for removing a hydrocarbon from an aqueous sample, the method comprising:
   delivering the aqueous sample having an initial concentration of the hydrocarbon into a feed side of a chamber comprising the composite membrane of claim 1 that divides the chamber into the feed side and a permeate side; and
   collecting from the permeate side an aqueous sample having a reduced concentration of the hydrocarbon compared to the initial concentration;
   wherein the aqueous sample has an initial concentration of the hydrocarbon in a range of 100-2,000 ppm, and wherein greater than 80% of a total amount of the hydrocarbon is removed from the aqueous sample.

17. The method of claim 16, wherein the hydrocarbon is diesel.

* * * * *